US008449227B2

(12) United States Patent
Danielsson (10) Patent No.: US 8,449,227 B2
(45) Date of Patent: May 28, 2013

(54) ROTATABLE TOOL FOR CHIP REMOVING MACHINING AS WELL AS A LOOSE TOP AND A BASIC BODY THEREFOR

(75) Inventor: Åke Danielsson, Torsåker (SE)

(73) Assignee: Sandvik Intellectual Property AB, Sandviken (SE)

(*) Notice: Subject to any disclaimer, the term of this patent is extended or adjusted under 35 U.S.C. 154(b) by 457 days.

(21) Appl. No.: 12/796,298

(22) Filed: Jun. 8, 2010

(65) Prior Publication Data

US 2010/0322723 A1 Dec. 23, 2010

(30) Foreign Application Priority Data

Jun. 23, 2009 (SE) ...................................... 0900845

(51) Int. Cl.
*B23B 51/02* (2006.01)

(52) U.S. Cl.
USPC ............ 408/233; 408/226; 408/230; 408/713

(58) Field of Classification Search
USPC .................. 408/44, 226, 227, 230, 231, 233, 408/713, 144
IPC ............................................. B23B 51/00,51/02
See application file for complete search history.

(56) References Cited

U.S. PATENT DOCUMENTS

| 5,399,051 | A | * | 3/1995 | Aken et al. | 408/233 |
| 6,012,881 | A | * | 1/2000 | Scheer | 408/227 |
| 6,514,019 | B1 | * | 2/2003 | Schulz | 408/59 |
| 6,582,164 | B1 | * | 6/2003 | McCormick | 408/226 |
| 7,134,816 | B2 | * | 11/2006 | Brink | 408/226 |
| 7,168,893 | B2 | * | 1/2007 | Takiguchi | 408/233 |
| 2010/0322731 | A1 | * | 12/2010 | Aare | 408/226 |
| 2011/0236145 | A1 | * | 9/2011 | Pabel et al. | 408/226 |

FOREIGN PATENT DOCUMENTS

| EP | 1 310 313 A1 | 5/2003 |
| EP | 1 358 979 A2 | 11/2003 |
| EP | 1 555 075 A1 | 7/2005 |
| JP | 2003071622 A * | 3/2003 |
| JP | 2003071622 A * | 3/2003 |
| JP | 2003291013 A * | 10/2003 |
| JP | 2003291013 A * | 10/2003 |
| WO | WO 2009 121595 A2 | 10/2009 |
| WO | WO 2009/128775 A1 | 10/2009 |

OTHER PUBLICATIONS

Swedish Office Action for Swedish Application No. 0900845-9, dated Dec. 7, 2009.

* cited by examiner

*Primary Examiner* — Daniel Howell
*Assistant Examiner* — Nicole N Ramos
(74) *Attorney, Agent, or Firm* — Morgan, Lewis & Bockius LLP

(57) ABSTRACT

A rotatable tool for chip removing machining including a basic body and a loose top; the body includes two torque-transferring drivers and an intermediate bottom in which a rear coupling part of the loose top is receivable, and a center hole that mouths in the intermediate bottom. A centric pin is insertable into the center hole, and a screw is accessible from the outside of the basic body. The coupling part includes a pair of side contact surfaces which cooperate with a pair of side support surfaces on the drivers of the basic body for the transfer of torque and negative axial forces between the coupling part and the drivers.

31 Claims, 9 Drawing Sheets

ROTATABLE TOOL FOR CHIP REMOVING MACHINING AS WELL AS A LOOSE TOP AND A BASIC BODY THEREFOR

This application claims priority under 35 U.S.C. §119 to Swedish Patent Application No. 0900845-9, filed on Jun. 23, 2009, which is incorporated by reference herein in its entirety.

FIELD OF THE INVENTION

The present invention relates generally to a rotatable tool intended for chip removing machining and of the type that includes, on one hand, a basic body having front and rear ends between which a first center axis extends, with which an envelope surface is concentric and around which the basic body is rotatable, and, on the other hand, a loose top that includes front and rear ends between which a second center axis extends with which an envelope surface is concentric. The front end of the basic body includes a jaw which is delimited by two torque-transferring drivers and an intermediate bottom, in which a rear coupling part of the loose top is receivable. A centric pin, which protrudes axially rearward from the coupling part, is insertable into a center hole that mouths in the bottom of the jaw. The center hole has a hole wall, which extends axially inside the basic body and in which a threaded hole being concentric with a third center axis, mouths, the hole being intended for a screw, which co-operates with the pin and is accessible from the outside of the basic body. The coupling part of the loose top and the drivers of the basic body include pairs of co-operating contact surfaces and support surfaces for the transfer of torque and axial forces between the same. The invention also relates generally to a loose top and a basic body as such.

Tools of the kind in question are suitable for chip removing or cutting machining of workpieces of metal, such as steel, cast iron, aluminium, titanium, yellow metals, etc. The tools may also be used for the machining of composite materials of different types.

BACKGROUND OF THE INVENTION

For more than a decade, drilling tools as well as milling tools have been developed, e.g., in the form of shank-end mills, that, contrary to integral solid tools, are composed of two parts, viz. a basic body and a head being detachably connected with the same and thereby being replaceable, and in which head the requisite cutting edges are included. In such a way, the major part of the tool can be manufactured from a comparatively inexpensive material having a moderate modulus of elasticity, such as steel, while a smaller part, viz. the head, can be manufactured from a harder and more expensive material, such as cemented carbide, cermet, ceramics and the like, which gives the requisite cutting edges a good chip-removing capacity, a good machining precision and a long service life. In other words, the head forms a wear part that can be discarded after wear-out, while the basic body can be re-used several times (e.g., 10 to 20 replacements). A now recognized denomination of such cutting edge-carrying heads is "loose tops", which henceforth will be used in this document.

On rotatable tools of the loose top type, a plurality of requirements are put, one of which is that torque should be transferable in a reliable way from the rotatable, driven basic body to the replaceable loose top. Furthermore, the basic body should, without problems, be able to carry the rearwardly directed, positive axial forces that the loose top may be subjected to during operation, e.g., drilling. Another requirement is that the loose top should be held centered in an exact and reliable way in relation to the basic body. Accordingly, each unintentional eccentricity between the center axis of the loose top and the center axis of the basic body should not be more than 0.01 mm. Most preferably, it should be smaller than 0.005 mm unless exact centricity can be achieved. A further requirement that is of particular importance as for drilling tools is that the loose top should be fixedly held to the basic body not only during drilling of a hole, but also during retraction of the drilling tool out of the same when the loose top is subjected to negative axial forces that aim to pull the same out of the jaw of the basic body. Yet another requirement or desire from the users' side is that the loose top should be mountable and dismountable in a rapid and convenient way without the basic body necessarily having to be removed from the driving machine. In addition, the tool, and in particular the loose top manufactured from an expensive material, should be possible to be manufactured at low costs.

Drilling tools as well as milling tools (shank-end mills) of the loose top type are widely known and may be divided into a number of different categories depending on the ideas on which the designs are based. Accordingly, there is a dividing line between a first category of tools that are based on the use of flexible, elastically bendable branches as drivers in the jaw of the basic body, and a second category of tools that utilize fixed, non-compliant lugs as drivers. In the first-mentioned category of tools, the branches are brought to be bent outward in connection with the mounting of the loose top, so as to then resiliently clamp the same in the jaw of the basic body. A general merit of such tools is that the clamping of the loose top in all essentials can be provided with the inherent elasticity of the branches. In other words, no separate tightening or lock features, e.g., in the form of screws are required.

A disadvantage of the fact that the drivers consist of flexible branches is, however, that the inherent elasticity of the branches runs the risk of being reduced after a certain time of use of the tool. When a number of loose tops have been replaced, the branches may accordingly start to be deformed plastically, rather than elastically, and in such a way successively lose their clamping force. There are many disadvantages with this. Above all, the loose top risks losing its exact centering in relation to the basic body. Furthermore, the ability of the drivers to counteract axial retraction of the loose top out of the jaw may be considerably impaired. This is particularly disadvantageous in connection with drilling tools, where the loose top risks remaining in the drilled hole in connection with the tool being pulled out of the same.

To the second category of tools, i.e., tools the torque-transferring drivers of which are non-compliant, belongs among others the drilling tool that is disclosed in U.S. Pat. No. 6,012,881. In this case, a rear coupling part of the loose top is inserted axially in a jaw between two non-compliant drivers, the insides of which include axially running, torque-transferring ridges that engage corresponding chutes in the coupling part of the loose top, besides which a centric pin protruding rearward from the loose top is inserted into a center hole that is formed in the basic body and mouths in the bottom of the jaw. With the pin, a radial screw mounted in a radial hole in the basic body co-operates with has the purpose of locking and centering the loose top in relation to the basic body.

A disadvantage of the drilling tool according to U.S. Pat. No. 6,012,881 is, however, that certain requirements on the tool are so conflicting that practical production of the same becomes difficult, not to say impossible. Accordingly, a fine fit is required between the concave and convex contact surfaces of the drivers and the coupling part, respectively, which have the purpose of centering the loose top, in order for the centering to become acceptable. The extremely fine fit between the contact surfaces means, however, that mounting as well as dismounting will be difficult to carry out. Another disadvantage is that all negative (retractive) axial forces that act on the loose top have to be carried by the radial screw alone via the pin. In order to manage this task, the radial screw has to be sturdy. What is more, also the fit between the centering pin of the loose top and the hole in the basic body has to be fine. Namely, if the fit is large (e.g., 0.1 mm), the radial screw will upon tightening apply radial forces to the pin and thereby the loose top that aim to space apart the loosetop from the centered position. If it is fine (e.g., about 0.01 mm), a frictional resistance difficult to overcome arises when the pin is to be pushed into and pulled out of, respectively, the hole.

The present invention aims at obviating the above-mentioned disadvantages of the known tool and at providing an improved loose-top tool, in particular a drilling tool. Therefore, an object of the invention to provide a loose-top tool in which the loose top in a reliable way can be retained in the jaw of the basic body even if the loose top is subjected to considerable negative axial forces. Furthermore, the invention aims at allowing an exceptionally exact centering of the loose top in relation to the basic body.

Another object of the invention is to provide a loose-top tool in which the loose top can be mounted in a simple and convenient way without taking into account any disadvantageous frictional resistance. Furthermore, the centering should be provided via the rear pin of the loose top, whereby the centering is made independent of other surfaces than co-operating contact surfaces on the pin and the receiving hole.

SUMMARY OF THE INVENTION

In an embodiment, the invention provides a rotatable tool for chip removing machining, including a basic body having front and rear ends between which a first center axis (C1) extends, with which an envelope surface is concentric and around which the basic body is rotatable; and a loose top that includes front and rear ends between which a second center axis (C2) extends with which an envelope surface is concentric. The front end of the basic body includes a jaw which is delimited by two torque-transferring drivers and an intermediate bottom in which a rear coupling part of the loose top is receivable, and a center hole that mouths in the intermediate bottom. The center hole has a hole wall which extends axially inside the basic body and in which a threaded hole being concentric with a third center axis (C3) mouths for a screw to co-operate with a centric pin which protrudes axially rearward from the coupling part. The centric pin is insertable into the center hole, and the threaded hole is accessible from the outside of the basic body. The coupling part of the loose top includes a pair of axial contact surfaces which cooperate with a pair of axial support surfaces on the drivers of the basic body for the transfer of positive axial forces between the coupling part and the drivers. The coupling part of the loose top includes a pair of side contact surfaces which cooperate with a pair of side support surfaces on the drivers of the basic body for the transfer of torque and negative axial forces between the coupling part and the drivers. The pair of side contact surfaces define two laterally projecting male members arranged to engage two corresponding seats defined by the pair of side support surfaces of the drivers in an axially locking position. The pin of the loose top includes a surface for turning the pin and the loose top by cooperation with the screw.

In another embodiment, the invention provides a loose top for rotatable tools for chip removing machining, including front and rear ends between which a center axis (C2) extends, with which a pair of envelope part surfaces are concentric, and a centric pin protruding from a rear coupling part. The coupling part separates two axial contact surfaces and includes two laterally protruding male members which are axially separated from the axial contact surfaces and prevent retraction of the coupling part out of a jaw in a tool basic body. The pin includes a surface for turning the pin and the loose top when the surface cooperates with a screw.

In yet another embodiment, the invention provides a basic body for rotatable tools for chip removing machining, including front and rear ends between which a center axis (C1) extends around which the basic body is rotatable, and with which an envelope surface is concentric. The front end includes a jaw which is delimited by two torque-transferring drivers, and an intermediate bottom in which there mouths a center hole. The center hole has a hole wall which extends axially inside the basic body and in which there mouths a radial hole that includes a female thread for a screw and that extends between the center hole and the envelope surface. Free, front ends of the drivers form axial support surfaces for a co-operating loose top, and in the insides of the drivers, seats are recessed, which open inward toward the center of the jaw.

The invention is based on the idea of isolating the necessary centering function and axial locking function from each other and simultaneously ensuring convenient mounting and dismounting, respectively, of the loose top. This is effected by allowing two opposite male members on the rear coupling part of the loose top to co-operate with two corresponding, female-like seats in the insides of the drivers, with the purpose of locking the loose top axially in the jaw between the drivers. In doing so, the centering of the loose top is in all essentials provided only by the rear pin that by a unique design allows an extremely exact centering of the loose top in relation to the basic body, without because of this giving rise to difficulties of mounting and dismounting, respectively, the loose top.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

In the following, a number of co-operating pairs of surfaces of the basic body and the loose top, respectively, will be described. When these surfaces are present on the basic body, the same are denominated "support surfaces", while the corresponding surfaces of the loose top are denominated "contact surfaces" (e.g., "axial support surface" and "axial contact surface", respectively).

Figure 1:
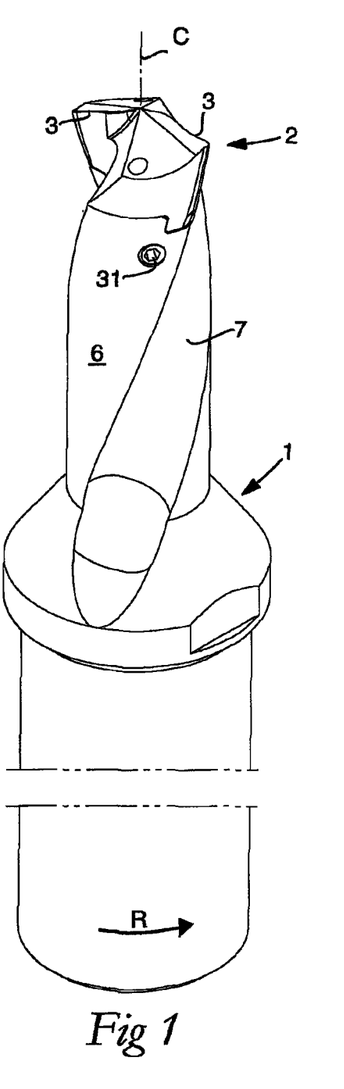
FIG. 1 is a perspective view of a loose-top tool in the form of a drilling tool, the basic body and the loose top of which are shown in an assembled state.
Figure 2:
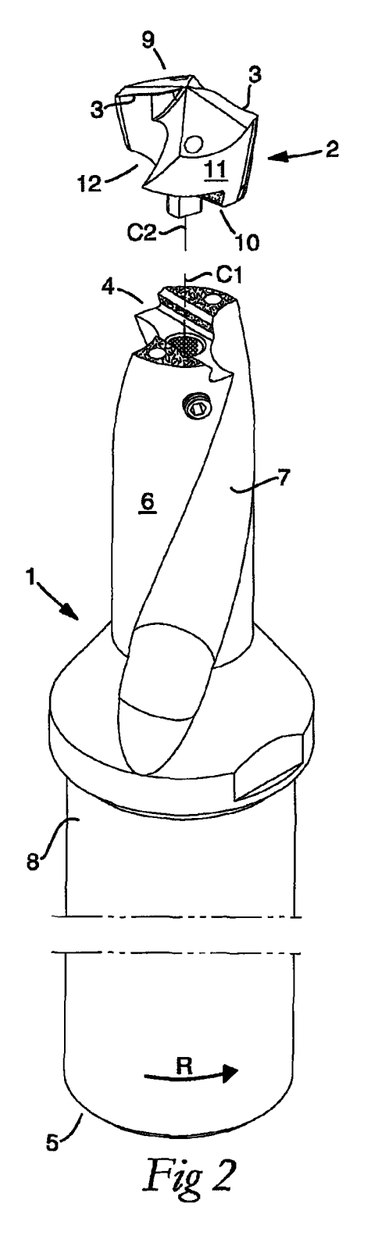
FIG. 2 is an exploded perspective view showing the loose top separated from the basic body.

In the drawings, the loose-top tool according to the invention has been exemplified in the form of a drilling tool, more precisely in the form of a twist drill, i.e., a drill the chip flutes of which are helicoidal. As is seen in FIGS. 1 and 2, the tool includes a basic body 1 and a loose top 2 in which the requisite cutting edges 3 are included. In its assembled, operative state according to FIG. 1, the drilling tool is rotatable around a center axis indicated by C, more precisely in the direction of rotation R. In FIG. 2, it is seen that the basic body 1 includes front and rear ends 4, 5 between which a center axis C1 specific to the basic body extends. In the backward direction from the front end 4, a cylindrical envelope surface 6 extends, in which two chip flutes 7 are countersunk that in this case are helicoidal (the invention is also applicable to so-called tap borers having straight chip flutes). In the example, the chip flutes 7 end in a collar included in a rear part 8 that is intended to be attached to a driving machine (not shown).

Also the loose top 2 includes front and rear ends 9, 10 and an own center axis C2 with which two convex envelope part surfaces 11 are concentric. Between these surfaces 11, two helicoidal chip flutes or chip flute sections 12 are countersunk, which form extensions of the chip flutes 7 of the basic body 1 when the loose top is mounted onto the basic body. If the loose top 2 is centered correctly in relation to the basic body, the individual center axes C1 and C2 coincide with the center axis C of the assembled drilling tool.

Since the major part of the basic body 1 lacks interest in connection with the invention, henceforth only the front end portion thereof will be illustrated together with the loose top 2, more precisely on an enlarged scale.

Figure 3:
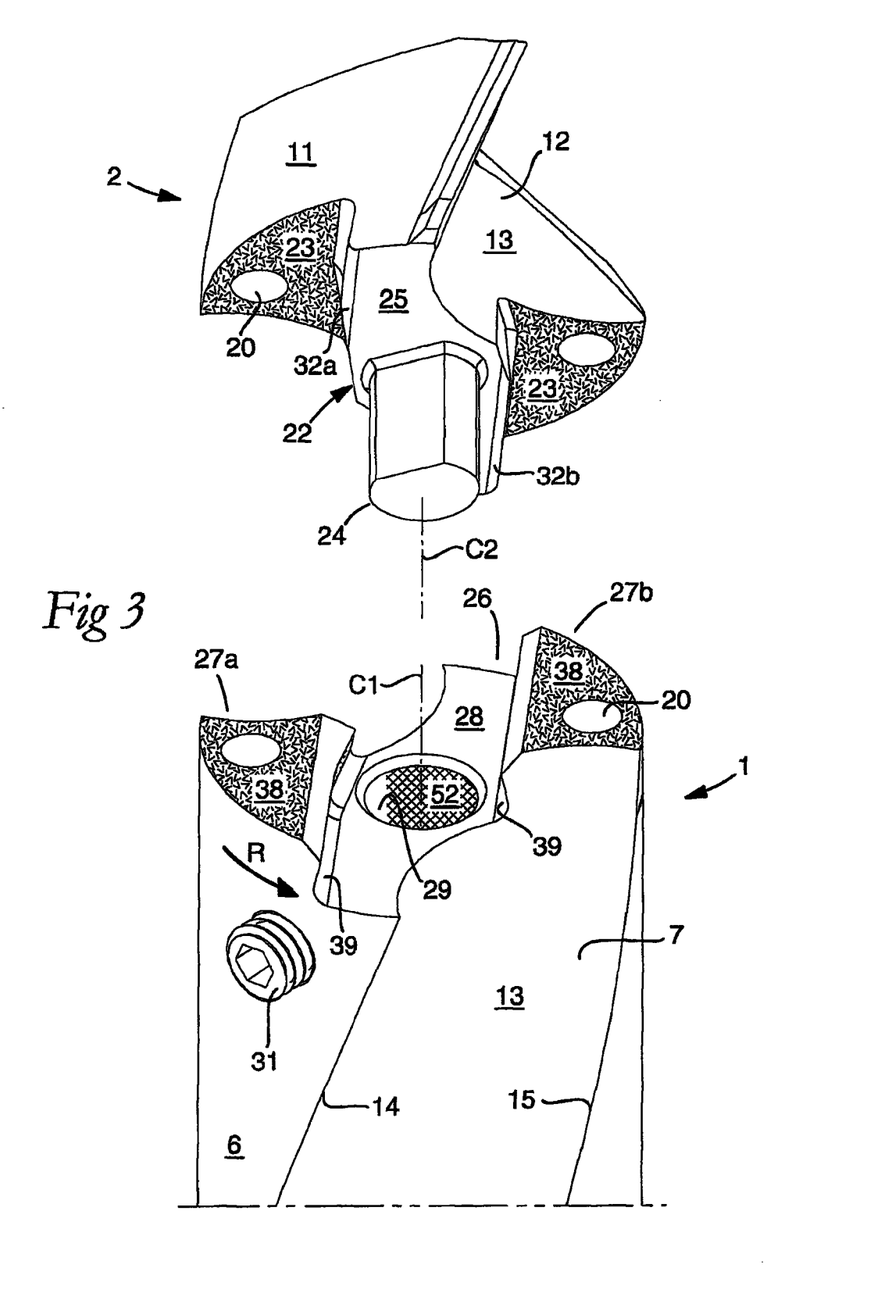
FIG. 3 is an enlarged exploded view showing a jaw included in the basic body from a top perspective view and a loose top from a bottom perspective view.
Figure 9:
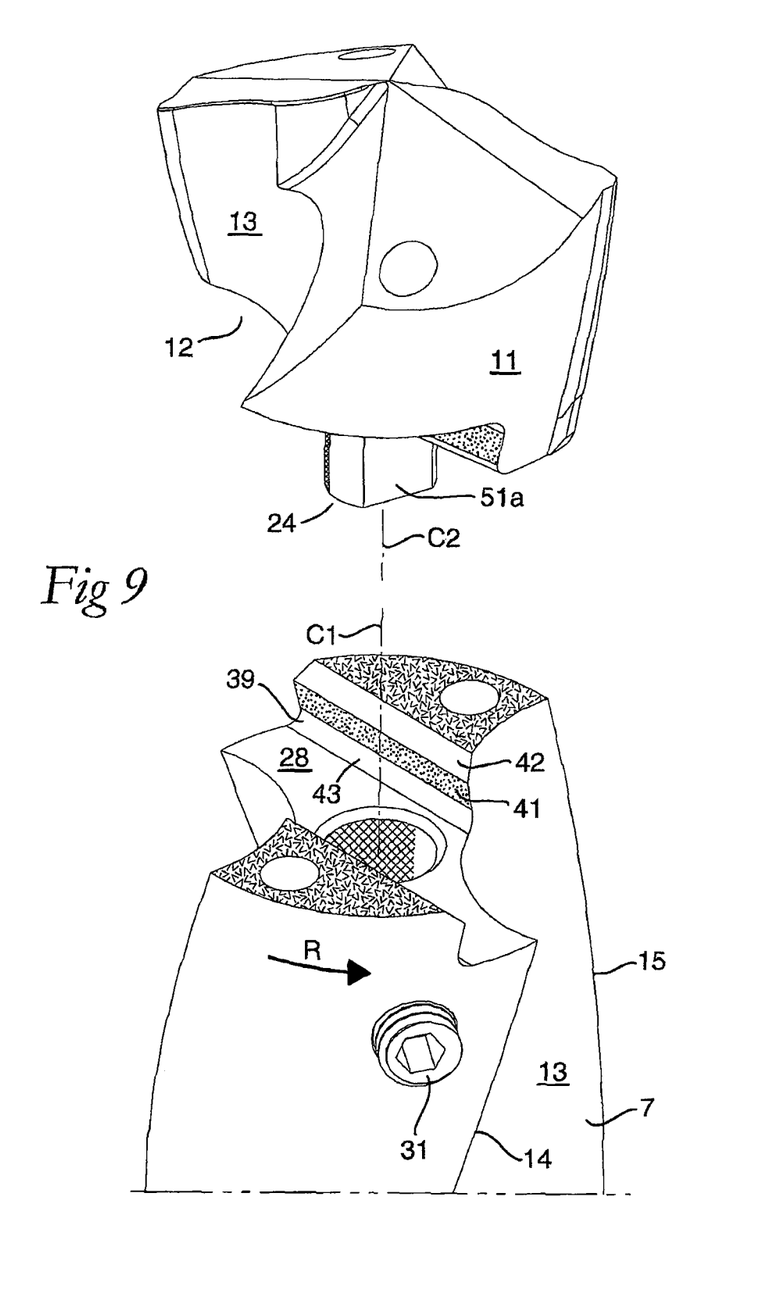
FIG. 9 is an exploded top perspective view of the basic body and the loose top.

Now reference is made also to other drawing figures, FIGS. 3 and 9 of which illustrate how the chip flutes 7 of the basic body 1 are delimited by concave surfaces 13 that extend between helicoidal borderlines 14, 15. In an analogous way, each chip flute 12 in the loose top 2 includes a concave limiting surface 13.

Figures 4, 5:
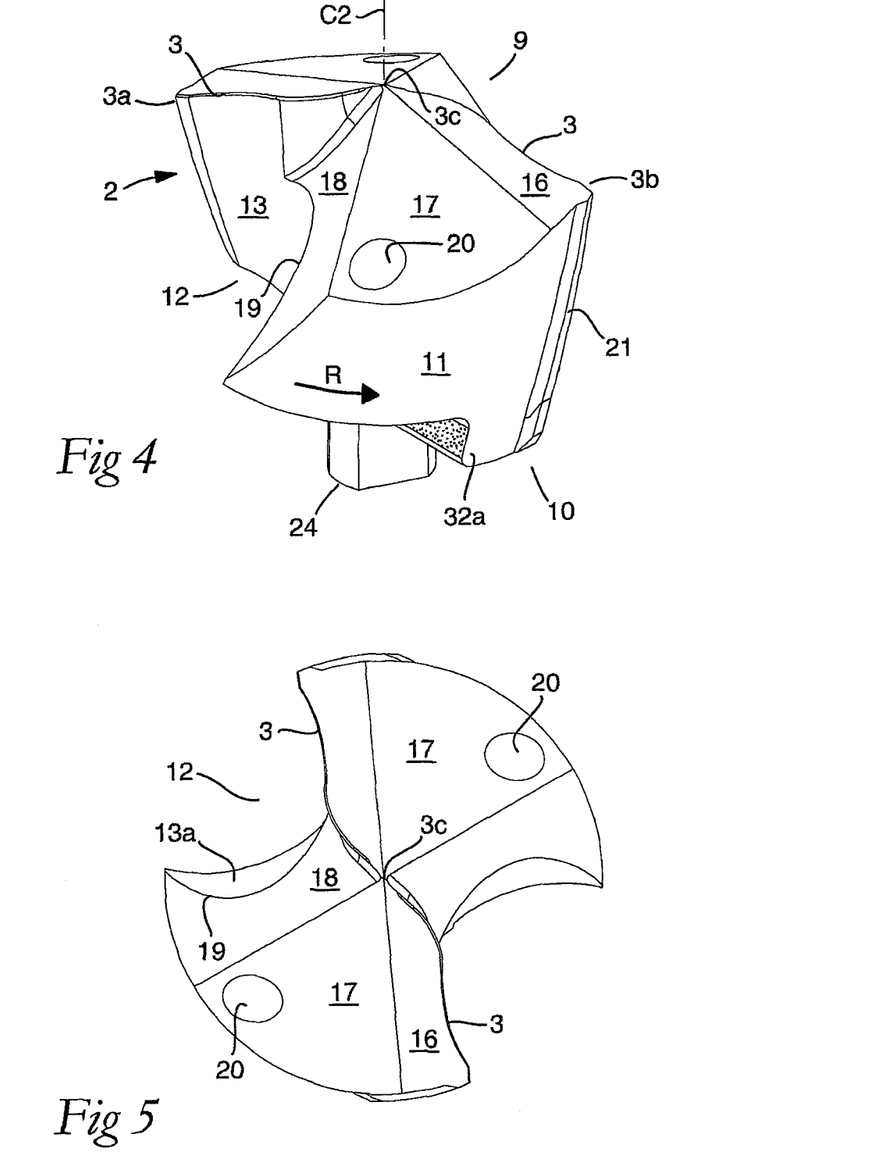
FIG. 4 is a top perspective view of the loose top.
FIG. 5 is an end view of the loose top as viewed from the front.

The front end 9 of the loose top (see FIGS. 4 and 5), in which the cutting edges 3 are included, is represented by an end surface that is composed of a plurality of part surfaces, which are identical in pairs and therefore not described individually. Behind the individual cutting edge 3—as viewed in the direction of rotation R—a primary clearance surface 16 is formed, which has a moderate clearance angle and transforms into a secondary clearance surface 17 having a greater clearance angle. The clearance surface 17 transforms into a third clearance surface 18, which in turn transforms into the chip flute 12 via a concave, arched borderline 19. In this case, in each secondary clearance surface 17, a flushing-medium duct 20 mouths. The concave limiting surface 13 of the individual chip flute 12 extends axially not only up to a borderline 19, but also up to an individual cutting edge 3, where it forms a chip surface adjacent to the same. In the transition between each surface 13 and the (rotationally) trailing envelope surface 11, a guide pad 21 is formed, the primary purpose of which is to guide the drilling tool in connection with hole making. Also the guide pad 21 may be utilized to surface-finish the generated hole wall. The diameter of the generated hole is determined by the diametrical distance between the peripheral points 3a, 3b where the cutting edges 3 meet the guide pads 21. It should also be mentioned that the cutting edges 3 converge into a front tip 3c and form an obtuse nose angle, e.g., within the range of 120-160°, with each other.

In FIG. 3, it is furthermore seen that the loose top 2 includes a coupling part generally designated 22, which is situated between two diametrically opposed axial contact surfaces 23. A centering pin 24 protrudes axially rearward from a plane, rear end surface 25 of the coupling part 22.

Figure 14:
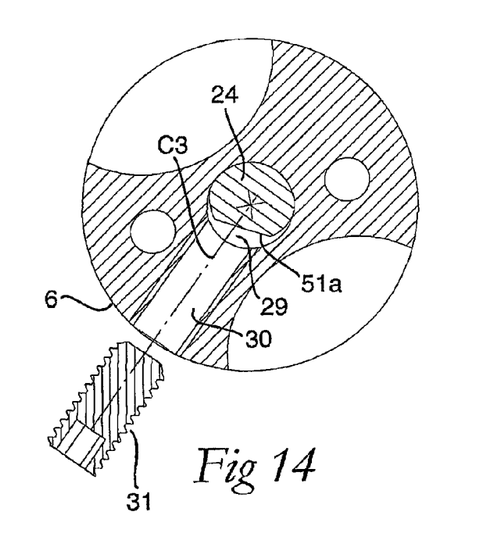
FIG. 14 is section A-A in FIG. 13 showing a screw separated from the basic body.

In the basic body 1, a jaw 26 (see FIG. 3) is formed, which is delimited by two diametrically separated drivers 27a, 27b as well as by an intermediate bottom surface 28. In the bottom surface 28, a center hole 29 mouths into which the pin 24 is insertable. The drivers 27a, 27b are essentially non-compliant lugs (contrary to elastically compliant branches). As may be best seen in FIG. 14, a through hole 30 extends radially between the center hole 29 and the envelope surface 6 of the basic body. In order to distinguish the hole 30 from the center hole 29, henceforth the same is denominated "radial hole". In the radial hole 30, the center axis of which is designated C3, a female thread is included that can co-operate with the male thread of a screw 31, which is arranged to co-operate with the pin 24.

In contrast to the radial screw that is included in the known tool, and that has the purpose of locking the loose top axially, the radial screw 31 of the tool according to the invention only has the purpose of turning the pin 24—and thereby the loose top in its entirety—and thereafter retain the same in a given position of turning. The axial locking of the loose top is, on the contrary, ensured by other more reliable means, viz. co-operating male and female members included in the coupling part and the drivers, respectively, as will be seen more in detail below.

Figure 12:
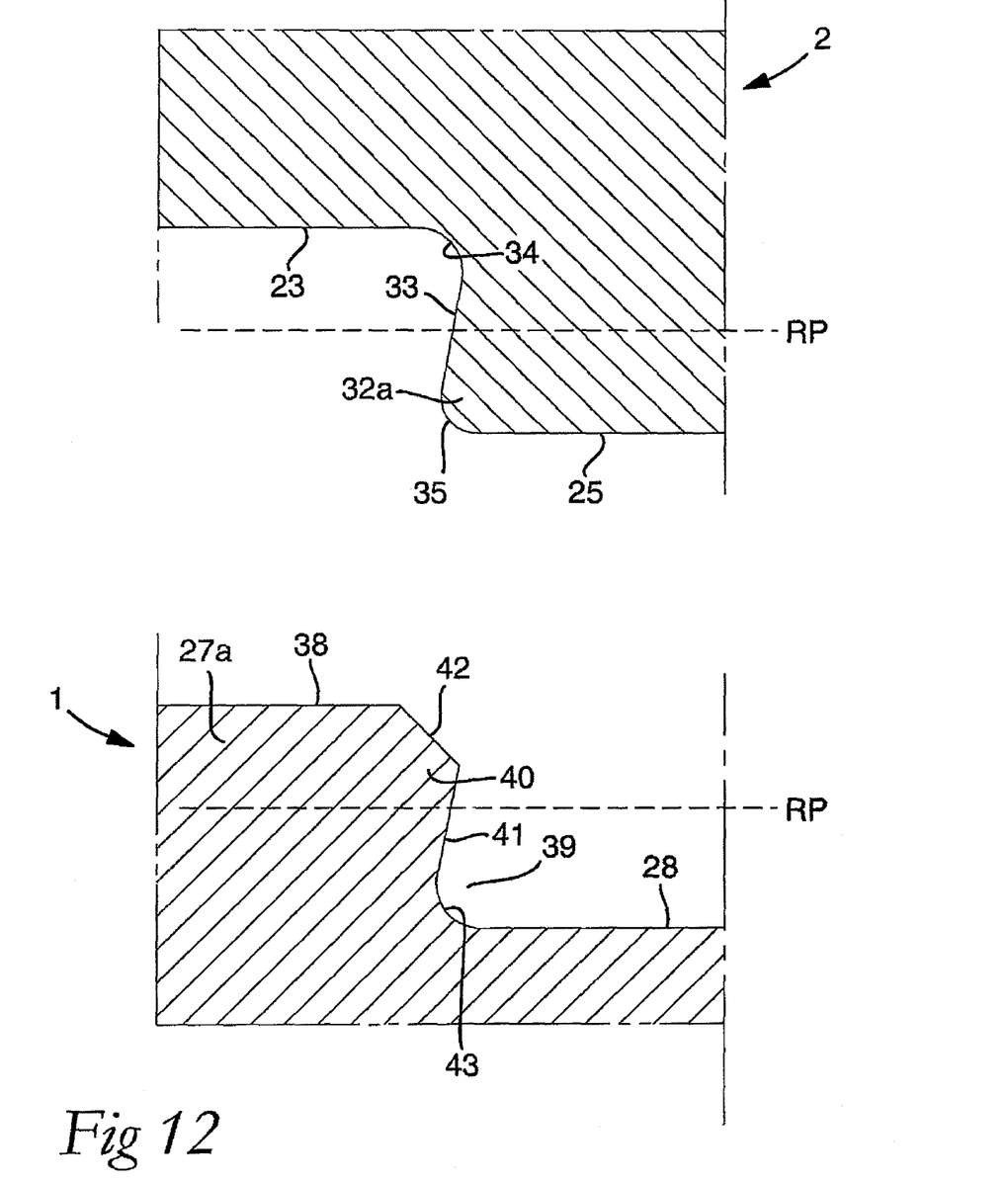
FIG. 12 is an analogous detailed section showing the loose top separated from the basic body.
Figure 13:
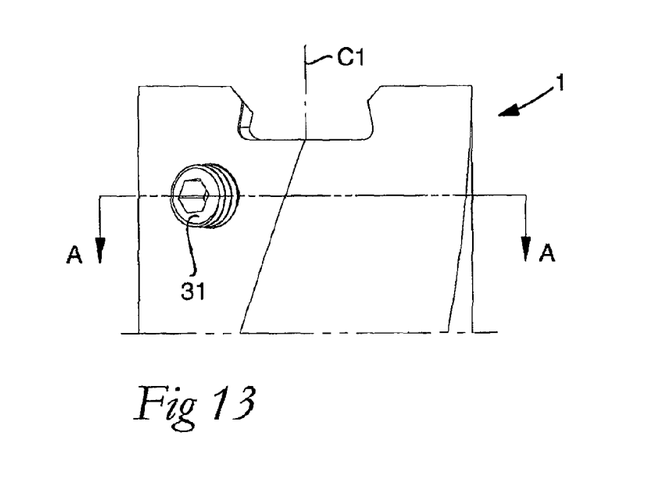
FIG. 13 is a partial side view of the front part of the basic body.

The coupling part 22 of the loose top has a long narrow, rail-like basic shape and extends diametrically between the two opposite envelope part surfaces 11. On opposite sides, the coupling part has a pair of laterally projecting male members 32a, 32b, which in the example are in the form of long narrow ridges. Each such ridge is delimited by a torque-carrying side contact surface 33 (see FIG. 12), which in this case is plane and intersected by a reference plane RP that is spaced-apart from the axial contact surface 23 and extends perpendicular to the center axis C2 of the loose top. Each side contact surface is inclined in relation to the reference plane RP, more precisely in the rearward/outward direction from a concave radius transition 34 which extends from the individual axial contact surface 23. At the rear end thereof, the side contact surface 33 transforms into a convex radius transition 35 to the plane, rear end surface 25 of the coupling part. The angle (lacks designation) between the individual side contact surface 33 and the reference plane RP amounts in the example to approx. 80°, but may vary upward as well as downward.

Figures 6, 7, 8:
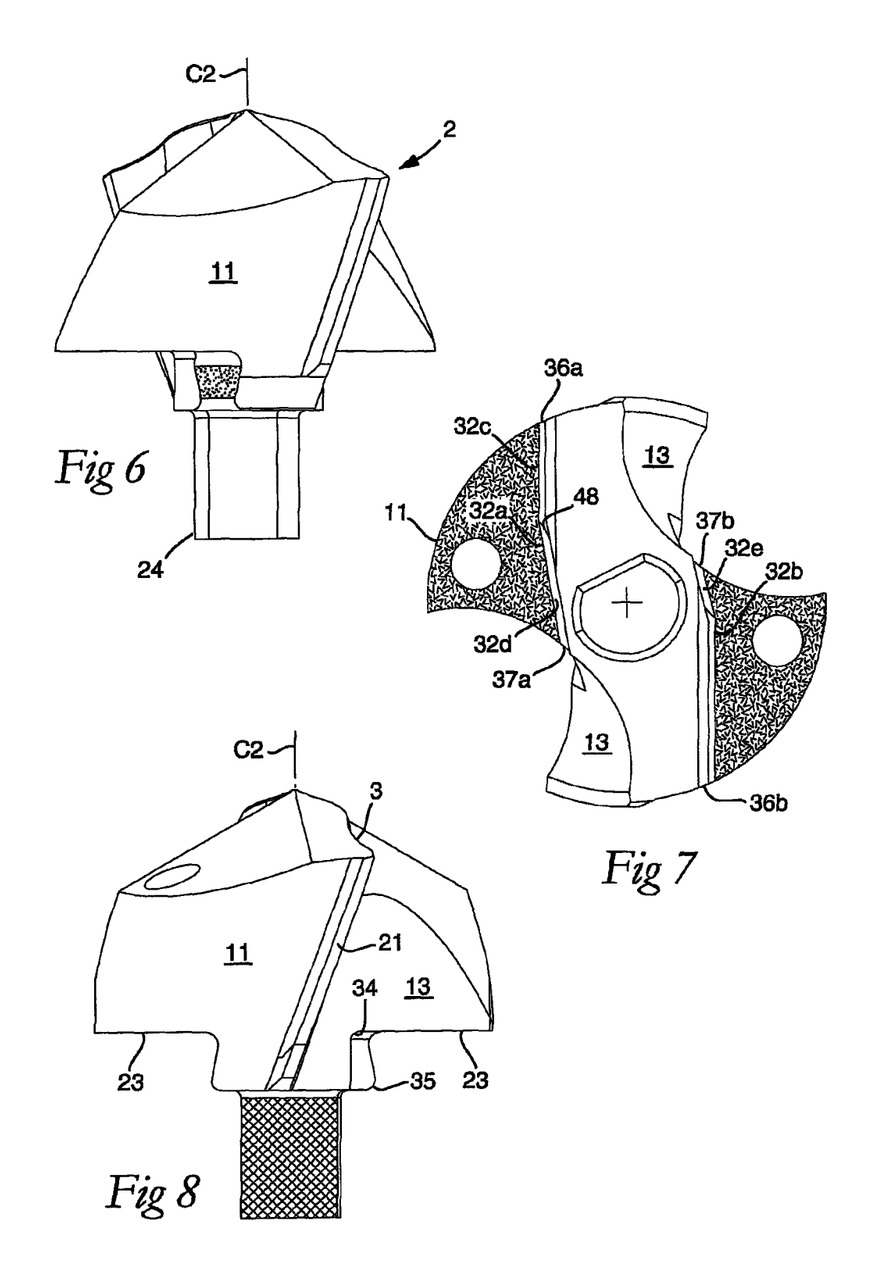
FIG. 6 is a side view of the loose top.
FIG. 7 is an end view of the loose top as viewed from behind.
FIG. 8 is an additional side view of the loose top as viewed at an angle of 90° to FIG. 6.

In FIG. 7, it is seen that one ridge 32a runs from the peripheral end 36a adjacent to one of the envelope part surfaces 11 to an inner end 37a in the vicinity of the center of the loose top, while the other ridge 32b extends from a peripheral end 36b to an inner end 37b in the area of the center of the loose top. It should be noted that the ridges individually extend only along approximately half the length of the coupling part 22 and end in a chip flute surface 13.

Figure 11:
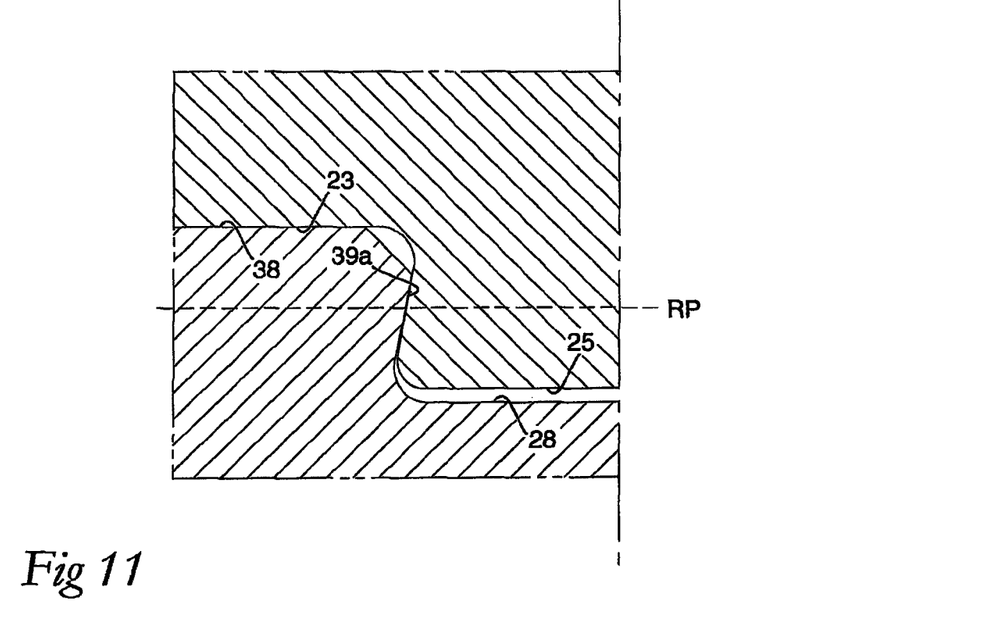
FIG. 11 is an enlarged detailed section in the assembled tool.

The axial contact surfaces 23 (see FIG. 3) of the loose top co-operate with axial support surfaces 38 of the free ends of the drivers 27a, 27b. In the example, the axial support surfaces 38 as well as the axial contact surfaces 23 are plane. In the insides of the drivers, chutes 39 (see also FIG. 12) are formed, which serve as female members and co-operate with the male members 32a, 32b on the coupling part 22 of the loose top. As may be best seen in FIG. 12, the individual chute 39 in the driver 27a is formed axially behind a bulge 40 that is delimited by a side support surface 41 included in the chute as well as by a chamfer surface 42 that forms a transition between the side support surface 41 and the axial support surface 38. Via a concave radius transition 43, the side support surface 41 transforms into the bottom surface 28 of the jaw. In the same way as the side contact surface of the loose top 33, the side support surface 41 is plane and inclined in relation to an intersecting reference plane RP spaced-apart from the axial support surface 38 and perpendicular to the center axis C1 of the basic body. In practice, the side support surface 41 and the co-operating side contact surface 33 may have approximately the same angle of inclination (e.g., 10°) in relation to the respective reference plane. The level difference between the surfaces 23 and 25 of the loose top 2 (see FIG. 12) is somewhat smaller than the level difference between the surfaces 38 and 28 of the basic body. When the loose top, in its operative state, is mounted to the coupling part in the jaw of the basic body, the axial contact surfaces 23 will therefore be pressed against the axial support surfaces 38 without the rear surface 25 of the coupling part contacting the bottom surface 28 of the jaw (see FIG. 11).

Figure 10:
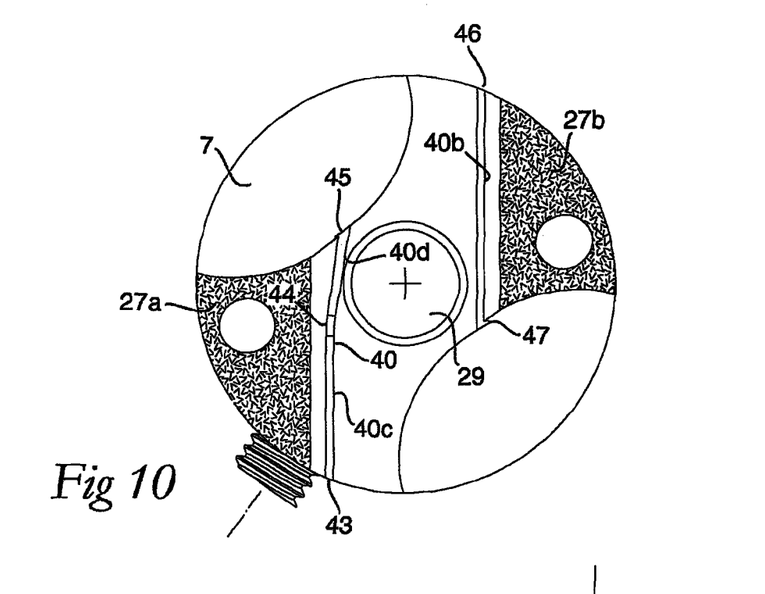
FIG. 10 is an end view of the basic body as viewed from the front.

In order to ensure that the loose top 2 is always mounted in a correct, predetermined way in relation to the screw 31, the ridges 32a, 32b have, like the bulges 40, been given unsymmetrical contour shapes. As is seen in FIG. 10, where the basic body 1 is shown axially from the front, the bulge 40 (on the driver 27a) shown to the left is broken into two sections 40c, 40d, a first 40c one of which extends inward from a peripheral end 43 to a breaking point 44, where the same transforms into a second section 40d, the sections 40c, 40d forming an obtuse angle (in the example, approx. 172°) with each other. It should also be observed that the inner end 45 of the bulge is situated in the vicinity of the center hole 29. More precisely, the bulge 40 runs up to one of the chip flutes 7. The other bulge 40 (on the driver 27b) is straight along its entire length from a peripheral end 46 to an inner end 47 adjacent to the other chip flute 7. As is seen in FIG. 7, the ridge 32a on the coupling part 22 of the loose top is in an analogous way angularly broken into two sections 32c, 32d, the first one 32c of which extends from a peripheral end 36a to a breaking point 48, where it transforms into the other section 32d while forming an obtuse angle (172°) with the same. The inner end 37a of the ridge 32a is situated in the vicinity of the pin 24. The opposite ridge 32b is generally straight, but transforms at the inner end thereof into a short, angled section 32e that only has the purpose of allowing the axial insertion of the coupling part into the jaw of the basic body.

It should be evident that that the asymmetry described above ensures that the coupling part 22 of the loose top only can be inserted axially into the jaw 26 in a single predetermined way. The reason therefore will be clearer below.

Figure 16:
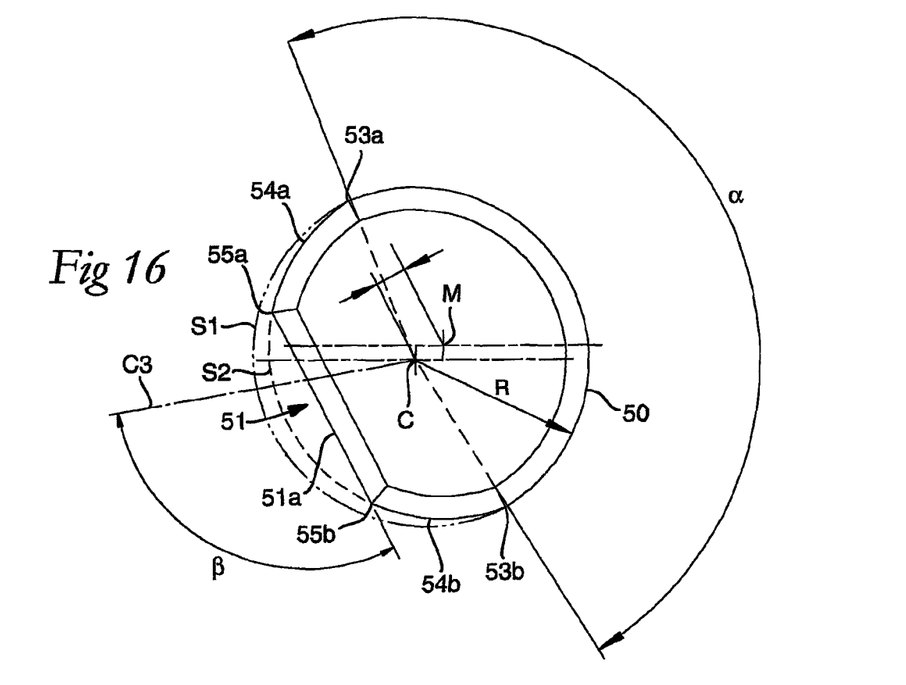
FIG. 16 is an enlarged and schematic picture that illustrates the geometrical design of a centering pin included in the loose top.

In the shown, preferred embodiment of the tool according to the invention, the centering of the loose top 2 is provided by a unique design of the pin 24 of the loose top in co-operation with the radial screw 31. A first embodiment of the pin is illustrated in the schematic picture in FIG. 16, where the hole wall of the hole 29 is assumed to be cylindrical and is shown with a dash-dotted circle S1, the center of which coincides with the center axis C1 of the basic body. The circle S1 forms simultaneously a circle circumscribed around the pin, the center of which coincides with the center axis C2 of the loose top. When the loose top is centered, the specific center axes C1 and C2 coincide with the center axis C of the composed tool, and therefore only the center axis C is shown in FIG. 16. The pin 24 is formed with two diametrically opposed part surfaces, a first part surface 50 which forms a contact surface, which in this case has a cylindrical basic shape and is pressable against the hole wall approximately in the surface field that is designated 52 in FIG. 3. This surface field 52 is situated opposite the radial hole 30. The contact surface 50 (see FIG. 16) extends tangentially between two axially running boundary generatrices 53a, 53b, which are situated along the circumscribed circle S1. The tangential extension of the contact surface 50 is determined by an arc angle α that according to the invention is less than 180°. In the example according to FIG. 16, a amounts to 170°. At the two boundary generatrices 53a, 53b, the contact surface transforms into two clearance surfaces 54a, 54b, which are included in a second part surface designated 51, in which also a plane shoulder surface 51a is included. The two clearance surfaces 54a, 54b are cylindrical and tangent to an imaginary, common circle S2, the center M of which is eccentric in relation to the center of the circumscribed circle S1, i.e., the center axis C. As is clearly seen in FIG. 16, the two clearance surfaces 54a, 54b are spaced-apart from the circular line S1, i.e., the hole wall in the hole 29, so far that the radial distance between the circle S1 and the respective clearance surface successively increases in the direction from the boundary generatrices 53a, 53b toward the boundary generatrices 55a, 55b in which the clearance surfaces transform into the plane shoulder surface 51a. By this geometry, it is ensured that the two clearance surfaces 54a, 54b do not contact the hole wall in the operative end position of the loose top. Furthermore, the geometry results in that the radial distance R between the center axis of the pin 24 and arbitrary points along the contact surface 50 delimited between the boundary generatrices 53a, 53b always is equally great and coincides with the corresponding radial distance between the hole wall and the center axis of the basic body. This means that the pin for certain is located with the center axis C2 thereof in a position coinciding with the center axis C1 of the hole when the contact surface 50 (by means of the screw 31) is pressed against the hole wall. In order to ensure an exact centering, the contact surface 50 of the pin may be made with extraordinary high dimensional accuracy, e.g., by precision grinding. In such a way, a dimensional deviation of 0.01 mm (or smaller) can be ensured.

In FIG. 16, the center axis C3 of the radial hole 30 is illustrated by a dash-dotted line. In relation to the center axis, the pin 24 assumes an initial position in the jaw 26 of the basic body, in which the plane part surface 51a is inclined at an angle β, which in the example amounts to 115°.

From what has been described above, it should be axiomatically clear that the pin 24 has a cross-sectional area that is less than the cross-sectional area of the hole 29.

Figure 17:
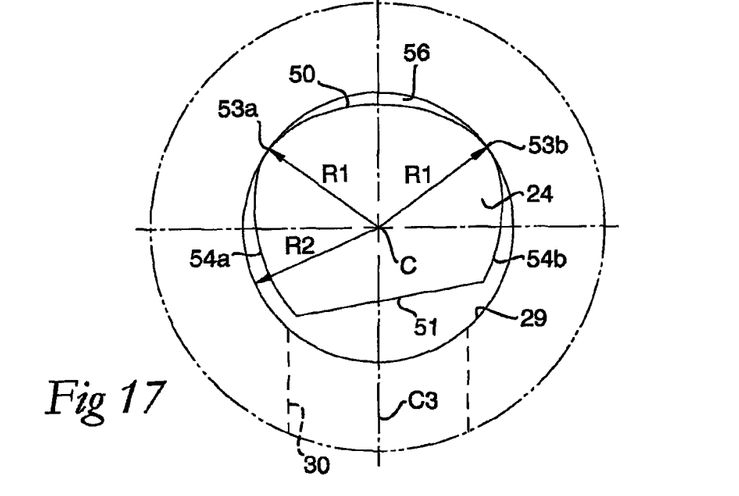
FIG. 17 is an analogous picture showing an alternative embodiment of the centering pin.

In FIG. 17, an alternative embodiment of the pin 24 is illustrated. Also in this case, the hole wall in the hole 29 is cylindrical and has a cross-sectional area that is larger than the cross-sectional area of the pin 24. Instead of being cylindrical, in this case the contact surface 50 of the pin 24 is elliptic between the two boundary generatrices 53a, 53b that determine the tangential extension of the contact surface. In doing so, a crescent-shaped gap 56 arises between the contact surface and the hole wall, the pin obtaining line contact with the hole wall in two separated places, viz. along the boundary generatrices 53a, 53b. By imparting the contact surface 50 a high dimensional accuracy, the radial distances or the radii R1 between the center axis of the pin (and of the loose top) and the boundary generatrices 53a, 53b may also in this case be made exactly as large as the radius R2 between the hole wall and the center axis of the basic body. When the screw is pressed against the inclined shoulder surface 51, accordingly an exact centering of the loose top is obtained regardless into which position the pin is turned.

In practice, the arc angle α between the generatrices 53a, 53b should amount to at least 90° and at most 175°.

Figure 15:
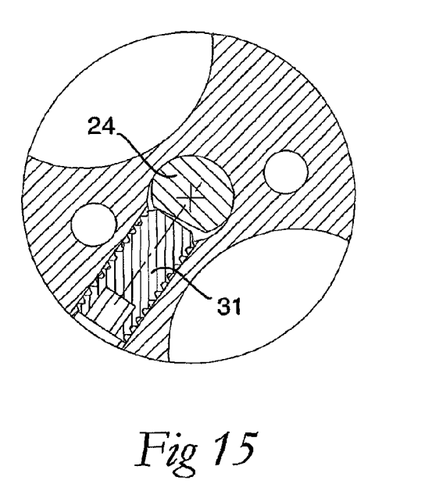
FIG. 15 is section A-A in FIG. 13 showing the screw inserted into a radial hole in the basic body.

When the loose top is to be mounted in the jaw 26 of the basic body, the screw 31 is held in an initial position in which the inner end thereof is removed from the center hole 29 of the basic body. In this state, the coupling part 22 of the loose top 2 is inserted axially between the drivers 27a, 27b and with the pin 24 sticking into the center hole 29. The insertion of the pin into the center hole can be made without any difficulties because the cross-sectional area of the pin is less than the cross-sectional area of the center hole. During this initial insertion of the coupling part and the pin, the axial contact surfaces 23 of the loose top will be pressed and rest against the axial support surfaces 38 of the drivers 27a, 27b (without the surfaces 25 and 28 contacting each other). Next, the loose top is turned toward its operative end position. This can initially be made manually, whereupon the screw 31 is tightened. In doing so, the screw will be pressed against the shoulder surface 51a of the pin (see FIG. 15), and by the fact that this is inclined in relation to the center axis C3 of the radial hole 30, the pin will be turned until the side contact surfaces 33 of the coupling part 22 are pressed in close contact with the corresponding side support surfaces 41 of the respective driver 27a, 27b. In such a way, the loose top 2 is locked axially in an extraordinarily efficient way, more precisely via the ridges 32 serving as male members on the coupling part 22 and the chutes 39 serving as female members in the drivers 27a, 27b of the basic body. In this axially locking position, the loose top is retained in a reliable way as long as the screw 31 locks the pin in the assumed angle position. In connection with the turning-in of the loose top, the inclination of the co-operating side contact surfaces 33 and side support surfaces 41 entails that the same is subjected to a positive axial force that aims to press the axial contact surfaces 23 against the axial support surfaces 38.

A fundamental advantage of the invention is that the negative (retractive) axial forces that act on the loose top are carried by the co-operating male and female members, i.e., the ridges and chutes, and not by the centering pin. If the unique design of the centering pin is applied, an utmost accurate centering of the loose top in relation to the basic body is furthermore obtained. In addition, the pin—in spite of the exact centering—can be inserted into and removed out of the receiving hole without difficulties as a consequence of the fact that the cross-sectional area of the pin is smaller than the cross-sectional area of the hole.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, the general idea of the invention, i.e., the idea of locking a turnable loose top by means of co-operating male and female members on the coupling part of the loose top and in the drivers of the basic body, respectively, may be applicable regardless of the design of the pin. However, the exemplified pin is preferred in order to provide an exact centering as well as a convenient mounting and dismounting, respectively. The invention is also applicable to other rotatable tools than exactly drilling tools, in particular milling cutters, such as shank-end mills. Accordingly, it is intended that the invention not be limited to the described embodiments, but that it have the full scope defined by the language of the following claims.

What is claimed is:

1. A rotatable tool for chip removing machining, comprising:
    a basic body having front and rear ends between which a first center axis (C1) extends, with which an envelope surface is concentric and around which the basic body is rotatable; and
    a loose top that includes front and rear ends between which a second center axis (C2) extends with which an envelope surface is concentric,
    the front end of the basic body including a jaw which is delimited by two torque-transferring drivers and an intermediate bottom in which a rear coupling part of the loose top is receivable, and a center hole that mouths in the intermediate bottom and has a hole wall which extends axially inside the basic body and in which a threaded hole being concentric with a third center axis (C3) mouths for a screw to co-operate with a centric pin which protrudes axially rearward from the coupling part, the centric pin being insertable into the center hole, and the threaded hole being accessible from the outside of the basic body,
    the coupling part of the loose top including a pair of axial contact surfaces which cooperate with a pair of axial support surfaces on the drivers of the basic body for the transfer of positive axial forces between the coupling part and the drivers,
    the coupling part of the loose top including a pair of side contact surfaces which cooperate with a pair of side support surfaces on the drivers of the basic body for the transfer of torque and negative axial forces between the coupling part and the drivers,
    wherein the pair of side contact surfaces define two laterally projecting male members arranged to engage two corresponding seats defined by the pair of side support surfaces of the drivers in an axially locking position, and the pin of the loose top includes a surface for turning the pin and the loose top by cooperation with the screw.

2. The tool according to claim 1, wherein the coupling part of the loose top is elongate.

3. The tool according to claim 2, wherein each male member is in the form of a long narrow ridge, while each corresponding seat is a long narrow chute situated behind a bulge.

4. The tool according to claim 3, wherein
    each side contact surface is intersected by a reference plane (RP) that is axially spaced-apart from the axial contact surfaces and extends perpendicular to the center axis (C2), each side contact surface being inclined in relation to the reference plane (RP) in a rearward and outward direction from a concave radius transition extending from the respective axial contact surfaces, and each side support surface is inclined in the rearward and outward direction toward the intermediate bottom of the jaw.

5. The tool according to claim 3, wherein each ridge and each chute extend between a peripheral, outer end and an inner end in the vicinity of a center axis (C) of the rotatable tool.

6. The tool according to claim 5, wherein the two ridges of the loose top have different contour shapes as viewed axially from behind, and the bulges of the drivers situated in front of the seats have different contour shapes as viewed in axially from the front, the contour shapes corresponding to each other in such a way that they make impossible an axial insertion of the coupling part into the jaw otherwise than in a single, predetermined way.

7. The tool according to claim 6,
wherein at least one of the ridges on the coupling part of the loose top is angularly broken and includes first and second sections, the first section extending inward from a peripheral end to a breaking point, and a second section that runs at an obtuse angle to the first section and extends from the breaking point to the inner end of the ridge, and
wherein a co-operating bulge on one of the two drivers of the basic body is angularly broken and includes first and second sections, the first section extending inward from the peripheral end to a breaking point, and a second section that runs at an obtuse angle to the first section and extends from the breaking point to the inner end.

8. The tool according to claim 7, wherein the first section of one of the ridges is shorter than a corresponding section of the other ridge running from the peripheral end.

9. The tool according to claim 1, wherein the pin of the loose top has a cross-sectional area that is less than a cross-sectional area of the center hole in the basic body, and the surface for turning the pin is a shoulder surface against which the screw is pressed.

10. The tool according to claim 9, wherein the pin includes a convex contact surface that is opposite the shoulder surface and extends between two axially running boundary generatrices which are situated along an imaginary circumscribed circle (S1), the center of which coincides with the center axis (C2) of the loose top, and between which an arc angle (α) is less than 180°, the contact surface, via the boundary generatrices, transforming into two clearance surfaces that are spaced-apart inwardly from the circumscribed circle (S1).

11. The tool according to claim 10, wherein the shoulder surface of the pin is plane.

12. The tool according to claim 11, wherein the clearance surfaces of the pin have a radius of curvature that is defined by an imaginary circle (S2), the center (M) of which is eccentric in relation to the center axis (C2) of the loose top.

13. The tool according to claim 12, wherein the center hole has a cylindrical shape.

14. The tool according to claim 13, wherein the contact surface on the pin of the loose top is cylindrical.

15. The tool according to claim 13, wherein the contact surface on the pin of the loose top is elliptic.

16. A loose top for rotatable tools for chip removing machining, comprising:
front and rear ends between which a center axis (C2) extends, with which a pair of envelope part surfaces are concentric; and
a centric pin protruding from a rear coupling part,
wherein the coupling part separates two axial contact surfaces and includes two laterally protruding male members which are axially separated from the axial contact surfaces and prevent retraction of the coupling part out of a jaw in a tool basic body, and
wherein the pin includes a surface for turning the pin and the loose top when the surface cooperates with a screw.

17. The loose top according to claim 16, wherein the coupling part is elongate and extends diametrically between the two envelope part surfaces.

18. The loose top according to claim 16, wherein each male member includes a torque-carrying side contact surface which is intersected by a reference plane (RP) that is axially spaced-apart from the axial contact surfaces and extends perpendicular to the center axis (C2), the side contact surface being inclined in relation to the reference plane in the rearward and outward direction from a radius transition extending from the axial contact surfaces.

19. The loose top according to claim 18, wherein each male member is a long narrow ridge that extends along a part of the coupling part between a peripheral, outer end and an inner end in the vicinity of the center axis (C2).

20. The loose top according to claim 19, wherein the two ridges of the male members of the coupling part have different shapes.

21. The loose top according to claim 20, wherein at least one of the ridges is angularly broken and includes first and second sections, a first section extending inward from the peripheral end of the coupling part to a breaking point, and a second section that runs at an obtuse angle to the first section and extends from the breaking point to an inner end.

22. The loose top according to claim 21, wherein the first section of one of the ridges is shorter than a corresponding section of the other ridge running from a peripheral end.

23. The loose top according to claim 16, wherein the surface for turning the pin is a plane shoulder surface that is opposite a contact surface.

24. The loose top according to claim 23, wherein the contact surface extends between two axially running boundary generatrices which are situated along an imaginary circumscribed circle (S1), the center of which coincides with the center axis (C2) of the loose top, and between which an arc angle (α) is less than 180°, the contact surface, via the boundary generatrices, transforming into clearance surfaces that are spaced-apart inwardly from the circumscribed circle.

25. The loose top according to claim 23, wherein the contact surface is cylindrical.

26. The loose top according to claim 24, wherein the clearance surfaces have a radius of curvature that is defined by an imaginary circle (S2), the center (M) of which is eccentric in relation to the center axis (C2) of the loose top.

27. The loose top according to claim 23, wherein the shoulder surface extends along the entire length of the pin.

28. A basic body for rotatable tools for chip removing machining, comprising:
front and rear ends between which a center axis (C1) extends around which the basic body is rotatable, and with which an envelope surface is concentric,
the front end including a jaw which is delimited by two torque-transferring drivers, and an intermediate bottom in which there mouths a center hole, the center hole having a hole wall which extends axially inside the basic body and in which there mouths a radial hole that includes a female thread for a screw and that extends between the center hole and the envelope surface,
wherein free, front ends of the drivers form axial support surfaces for a co-operating loose top, and in the insides of the drivers, seats are recessed, which open inward toward the center of the jaw.

29. The basic body according to claim 28, wherein each seat is delimited by a torque-transferring side support surface, which is intersected by a reference plane (RP) that is axially spaced-apart rearward from the axial support surfaces and extends perpendicular to the center axis (C1), the side support surface being inclined in relation to the reference plane in the inward and forward direction.

30. The basic body according to claim 29, wherein each seat is a long narrow chute that extends along a respective driver between a peripheral, outer end, and an inner end in the vicinity of the center axis C1.

31. The basic body according to claim 30, wherein the two chutes are formed axially behind bulges that have different contour shape as viewed axially.

\* \* \* \* \*